May 5, 1925.  1,536,737
A. J. WILLIAMS
ROTARY ENGINE FOR VEHICLE WHEELS
Filed Aug. 23, 1922   4 Sheets-Sheet 1

Inventor
A. J. Williams
By Lacy Lacey, Attorneys

May 5, 1925.
A. J. WILLIAMS
1,536,737
ROTARY ENGINE FOR VEHICLE WHEELS
Filed Aug. 23, 1922
4 Sheets-Sheet 2
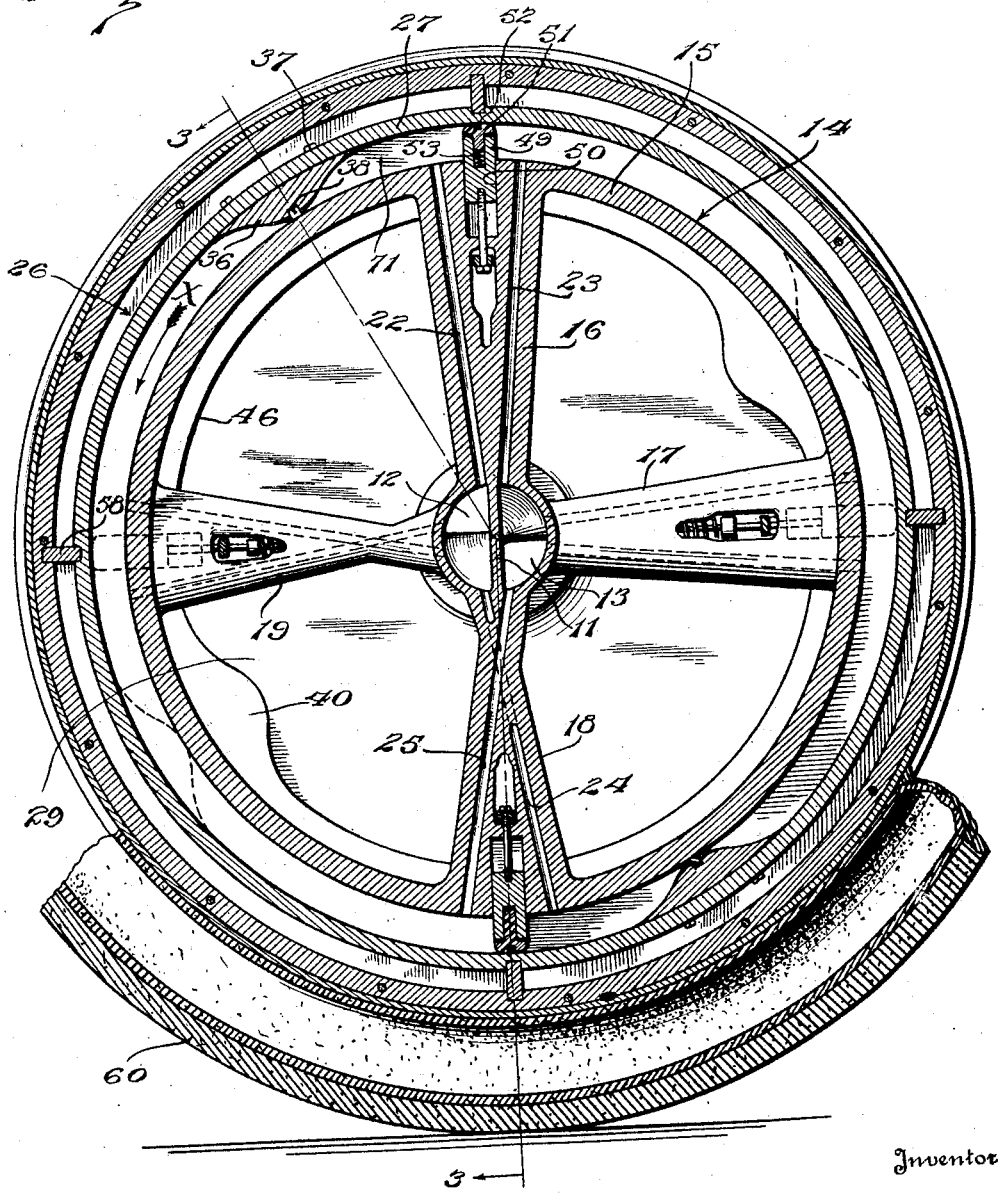

May 5, 1925.
A. J. WILLIAMS
ROTARY ENGINE FOR VEHICLE WHEELS
Filed Aug. 23, 1922
1,536,737
4 Sheets-Sheet 3
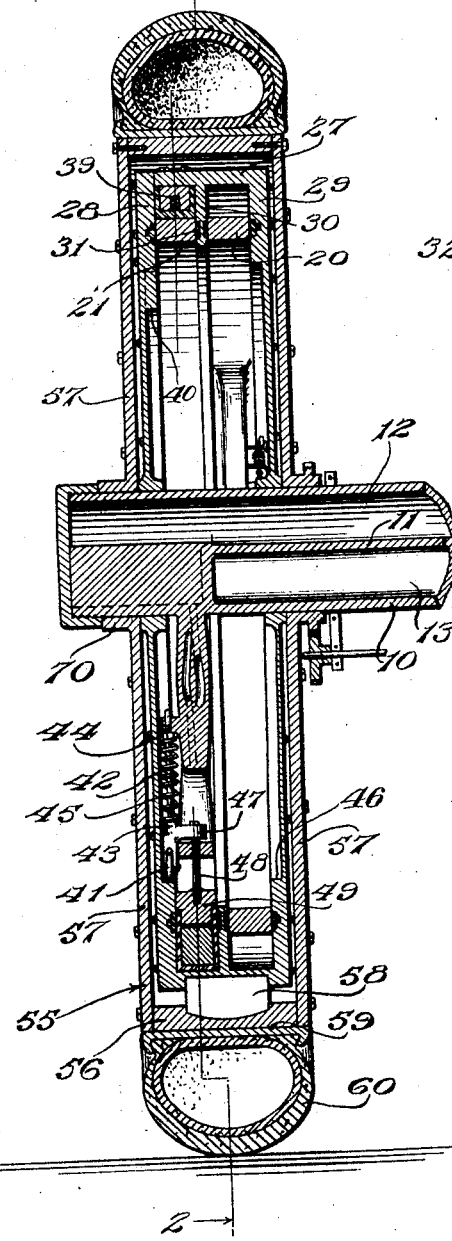
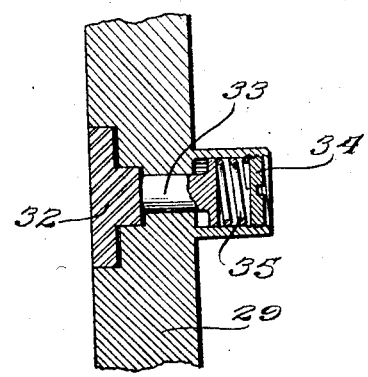
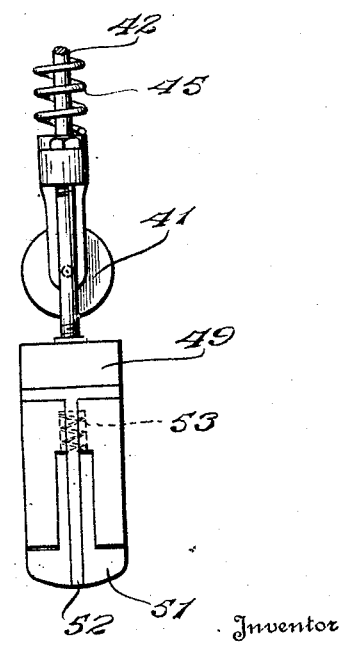
Inventor
A. J. Williams
By Lacy & Lacy, Attorneys

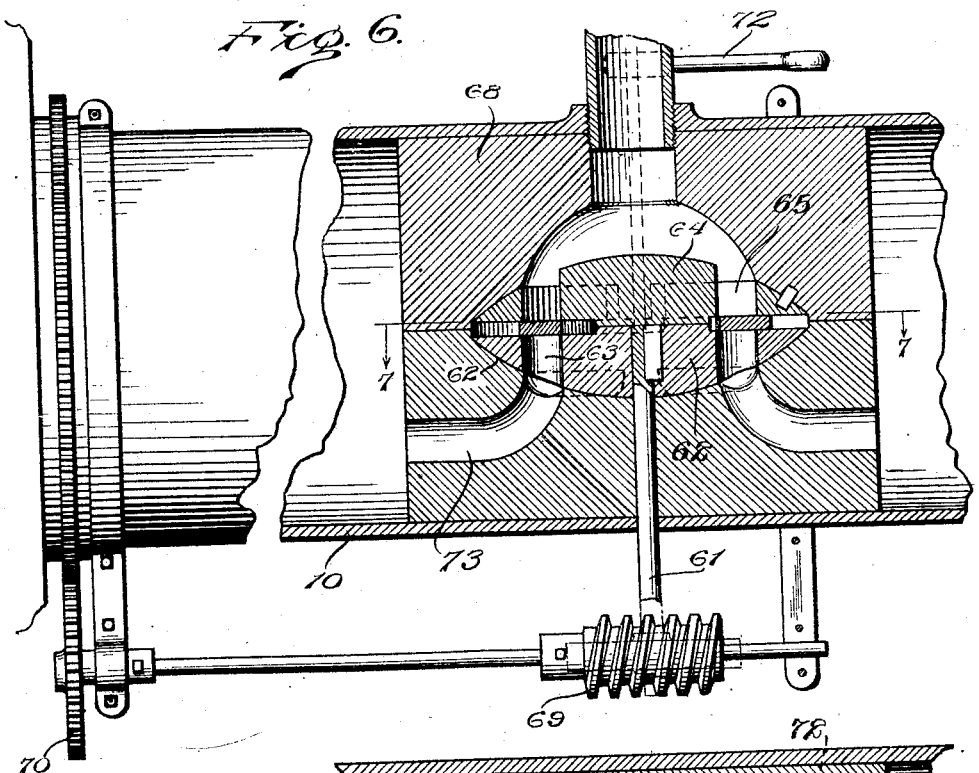
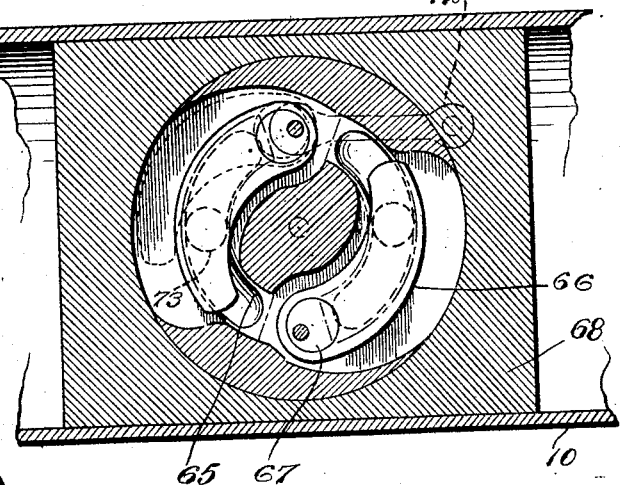
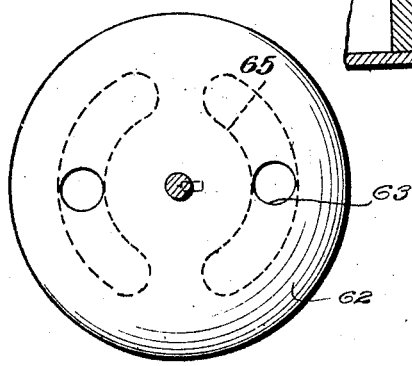

Patented May 5, 1925.

1,536,737

UNITED STATES PATENT OFFICE.

ARTHUR J. WILLIAMS, OF NASHVILLE, TENNESSEE, ASSIGNOR OF ONE-FOURTH TO CHEEVER J. CAMERON, ONE-FOURTH TO WILLIAM F. GLENN, JR., AND ONE-FOURTH TO IVA B. GLENN, ALL OF NASHVILLE, TENNESSEE.

ROTARY ENGINE FOR VEHICLE WHEELS.

Application filed August 23, 1922. Serial No. 583,843.

*To all whom it may concern:*

Be it known that I, ARTHUR J. WILLIAMS, citizen of the United States, residing at Nashville, in the county of Davidson and State of Tennessee, have invented new and useful Improvements in Rotary Engines for Vehicle Wheels, of which the following is a specification.

The present invention relates to rotary engines and the main object of the invention is to construct these engines to form part of the running gear of automobiles. In other words the engine is adapted to be inserted in the driving wheels of automobiles or other vehicles and forms part thereof, the wheel axle also being included in the engine.

The engine is primarily constructed as a steam engine but may utilize other fluids as motive force.

The engine is extremely simple consisting of few parts and all transmission gear is omitted, which ordinarily transfers power from the motor to the driving wheels. For this reason the number of parts of the engine is considerably reduced and a chance of the engine getting out of order is proportionately diminished.

The rotary engine can be applied not only to ordinary vehicle wheels but also to wheels having pneumatic tires. It will also be evident that the invention can be applied with advantage to motors with pulleys or sheaves to drive other machines.

In the accompanying drawings one embodiment of the invention is illustrated, and Fig. 1 shows a side elevation, partly in section, of a vehicle wheel with the engine installed;

Fig. 2 is a vertical section along line 2—2 of Fig. 3;

Fig. 3 is a section along line 3—3 of Fig. 2;

Fig. 4 is a sectional view of a packing ring;

Fig. 5 is a side elevation of one of the sliding abutments or gates;

Fig. 6 is a sectional view of a sliding valve;

Fig. 7 is a section along line 7—7 of Fig. 6 and

Fig. 8 is a top plan view of the valve body.

Figure 1:
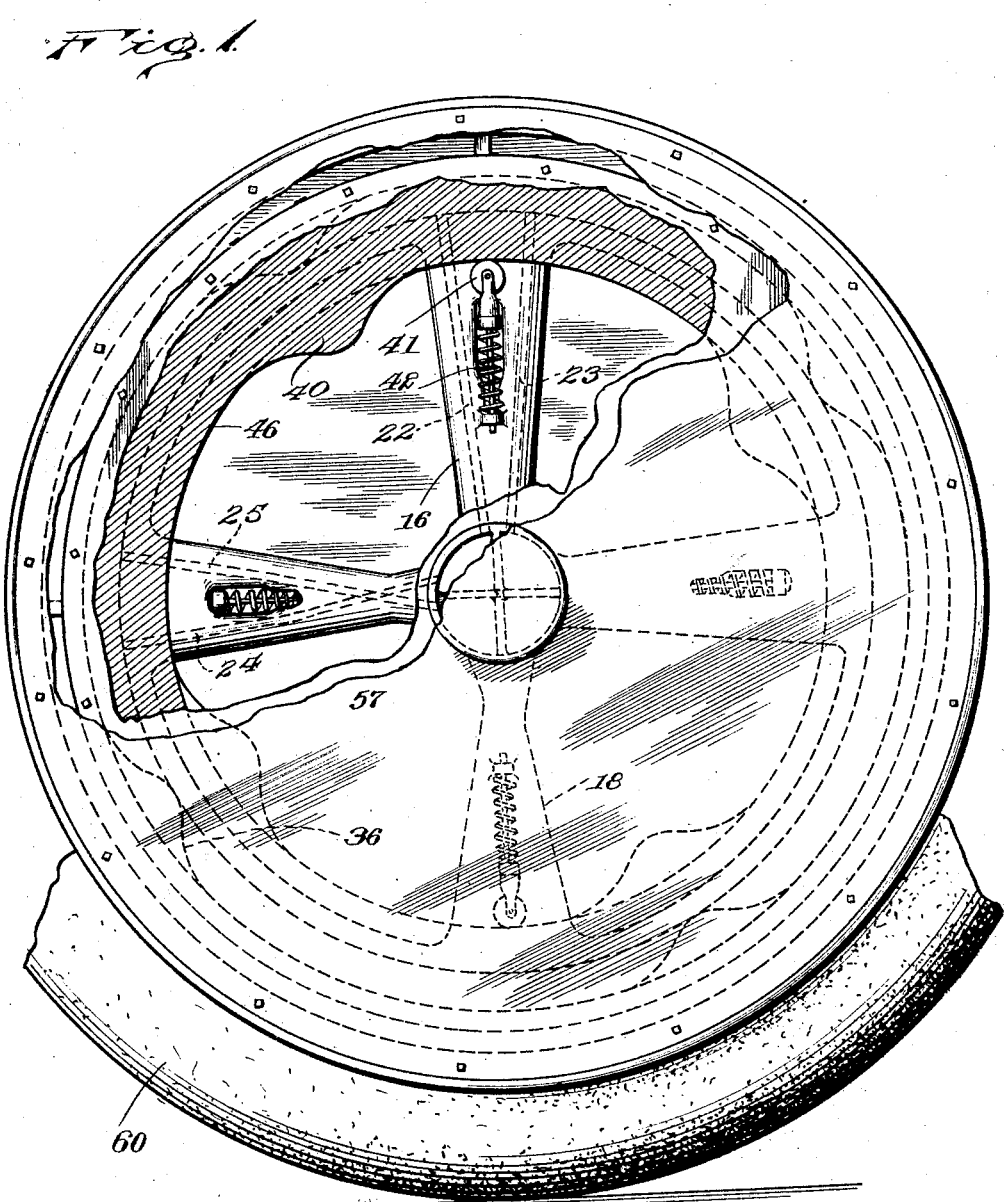

In the drawings reference numeral 10 represents a wheel axle which is rigidly secured in the vehicle and divided longitudinally by diagonal partitions 11 into four compartments 12 and 13 of which 12 communicates with the live steam supply, while chambers 13 constitute the exhaust manifold.

A stator 14, consists of a cylindrical drum 15 and radial spokes 16, 17, 18 and 19 forming integral parts with the axle 10. The spokes 16, 17, 18 and 19 are provided in pairs of which 16 and 18 run in alinement across the stator and 17 and 19 also running in alinement with each other but at right angles to the first pair of spokes 16 and 18. One pair 16 and 18 of the spokes are also offset in axial direction with regard to the other pair 17 and 19 and the drum 15 is split circumferentially in the middle to form two rims 20 and 21, see Fig. 3. These spokes are each provided with two passages as seen in Fig. 2 where passage 22 leads from the intake chamber 12 through the spoke 16 opening in the periphery of the rim, while the other passages 23 in the same spoke, forms an exhaust passage leading from the periphery of the rim into the exhaust manifold 13. Similarly the spoke 18 has a passage 24 leading from the intake chamber 12 to the periphery of the rim, while exhaust passage 25 leads from the rim of the wheel into the exhaust manifold 13. In this manner each of the spokes is provided with intake and exhaust ports where the passages open in the periphery of the stator. The other pair of spokes 17 and 19 are similarly provided with intake and exhaust passages arranged in the same manner.

The rotor 26 is revolubly mounted on the wheel axle 10 and encloses entirely the stator 14. This rotor consists of a cylindrical wall 27 and side walls 28 and 29 held rigidly together, the side walls reaching inwardly and engaging the wheel axle. A central partition 30 is furnished in the cylindrical wall 27 and reaches inwardly therefrom and engages between the two rims 20 and 21 and is preferably provided with suitable packings 31 for engaging the sides of the rims. Adjacent to the outer surface of these rims, the side walls 28 and 29 are provided with an annular groove in which is inserted a packing ring 32. This packing ring is at its opposite ends engaged by a plunger 33, between which and a screw plug 34 is inserted a coiled compression spring 35, which tends to push the packing ring 32 against the side of the adjacent rim. These plungers 33 are spaced in a circle in the side walls 28 and 29, so that uniform pressure may be obtained between the packing rings 32 and the rims 20 and 21 through the adjustment of the screw plugs 34.

Diametrically opposite each other on the inside of the cylindrical wall 27 are furnished two abutment members 36 which are preferably made separate from the rotor and secured thereon by means of screws 37. There is a pair of these abutments for each rim of the stator and the height of the abutments is slightly less than the distance between the rims 20 and 21 and the cylindrical wall 27 of the rotor. The abutments for one rim, however, are placed at right-angles to the abutments for the other rim and in this manner two steam chambers are furnished, one on each side of the partition 30 between the rims 20 and 21 and the cylindrical wall 27 of a rotor. Each abutment is provided with a suitable packing 38 placed in a corresponding groove in the abutment and preferably pushed inwardly by means of springs 39. The packing 38 will in this manner continuously contact with the outer periphery of a corresponding rim 20 or 21, while the apex of the abutment 36 is spaced slightly therefrom and the sides of each abutment slope gradually down from its apex to the inner periphery of the cylindrical wall 27.

With the abutments 36 and two spokes in the stator for each of the rims 20 and 21 there are also provided two oppositely positioned cams 40 on each side wall 28 and 29 of the rotor. These cams 40 are of similar contour as the abutments 36 having each an inwardly directed ridge and the cams on the one wall 28 are positioned at right-angles to the cams on the opposite wall 29, that is to say the four abutments are spaced 90 degrees apart, each pair being situated on the same diametrical line. These cams are actually formed as ledges on the side walls for the purpose of engaging with rollers 41 carried on rods 42, which are suitably guided in the spokes 16, 17, 18 and 19 respectively. A shoulder 43 is formed on each rod, between which and an adjusting nut 44 at its opposite end is inserted a coiled spring 45, adapted to press the roller 41 against its respective cam. Between the cams a cylindrical ledge 46 is provided in the walls of the rotor forming a path for the rollers 41. As best seen in Fig. 3 the rod 42 has a lug 47, to which is secured a bolt 48 attached to the body of a gate 49. This gate is suitably guided in radial direction in the recess 50 formed for each gate in its respective spoke and the outer edge of each gate 49 has a T-head or packing carrier 51 with a packing 52 adapted to slide on the inner face of the cylindrical wall 37 of the rotor and to constantly contact therewith. It will be evident, that in this manner the gates 49 will be lifted by the cams 40 through the intermediary of the rollers 41 and rods 42, an amount sufficient to pass them over the abutments 36, while the T-head or packing carrier 51 continuously contact with the surface of the abutments or the inner periphery of the wall 27. Accordingly the entire weight of the gates 49 will be supported on the cams 40 or the cylindrical ledge 46 during the revolution of the rotor, while the pressure against the inner surface of the cylindrical wall 27 and the surface of the abutments will be approximately equal to the pressure from springs 53, which tend to push their respective T-head or packing carrier 51 outwardly. In this manner wear and friction is eliminated as much as possible and a smooth running of the rotor is assured.

The rotor 26 is entirely enclosed by casing 55, which constitutes the wheel proper and consists of a drum 56 and two sides 57 rigidly held together. The rotor 26 and the casing 55 are connected by means of several transverse keys 58, in this manner compelling the casing to partake in the revolution of the rotor 26. Around the casing is preferably secured a flanged rim 59 adapted to engage with the pneumatic or solid rubber tire 60, here shown as a clincher tire.

In Figs. 6 to 8 is shown a valve suitable for regulating the supply of steam for the intake ports. This device consists of a so-called "steam cut-off" and is enclosed in a casing 68 inserted in the axle 10 and operated by means of a spindle 61 geared to the rotor as at 69 and 70 and connected with the disk 62, which is provided with suitable ports 63. The other disk 64 is provided with slots 65 communicating through the ports 63 with the passages 73 leading to the intake ports 12; and a slide 66 eccentrically operated as at 67 and 72 governs the opening and closing of the slots and ports in the "cut-off." This device cuts off the steam when the pistons or abutments 36 are passing the intake and exhaust ports but the steam may be cut off during any part of the stroke by means of the slide 66 operated by the eccentric 67.

To operate this motor, steam is admitted to the intake chambers 12 of the hollow axle 10 and carried through the leads or passages 22 and 24 opening in the steam chambers 71 between the gates 49 and the abutments 36 as seen in Fig. 2. The steam will then act on the rear side of the abutments 36 to turn the rotor in direction of arrow X in this figure. When the abutments pass the exhaust ports or passages 23 and 25, the steam supply is closed by the "cut-off." Simultaneously the cams 40 commence to raise the sliding abutments or gates 49 through the intermediary of the rollers 41 and the rods 42. In the drawings the cams 40 are shown to be situated substantially on the same radial lines as their corresponding abutments, but as a matter of fact the cams are advanced about ten one-thousandths (10/1000) of an inch as regards the abutments. It will be evident by having the abutments and cams on one side of the stator offset 90 degrees with regard to those on the other side, that more even running of the motor is attained and dead centers are avoided. Instead of having two cams and abutments on each side of the stator, three or more may be utilized producing still more even running. This increase of the number of said parts is particularly suitable for wheels of greater diameter. The spent gases are ejected through exhaust ports 23 and 25 and manifold 13 directly to the atmosphere.

In some cases it may be found advantageous to hold the casing with the member 26, here described as the rotor, stationary and permit the member 14 to revolve. Accordingly the wheel axle 10, will then also revolve and be used as a main shaft with sheaves, pulleys or gearing to drive other machinery.

Having thus described the invention, what is claimed as new is:

1. A rotary engine comprising a stator in the shape of a cylindrical drum, a central hollow shaft, radial spokes connecting said drum and shaft and being integral therewith, a longitudinal partition in said hollow shaft extending diametrically across the same and defining manifolds, said spokes each having a pair of tubular intake passages leading in radial direction from said manifolds to the outer periphery of the drum; a cylindrical rotor enclosing said drum and forming an annular space around the same, abutments on the rotor having the radial extent of said annular space and the circumferential extent identical on both sides of their apex, gates yieldably mounted in said drum, and symmetrically situated between a pair of said passages, and means for raising each gate over an abutment and independent thereof, said means being actuated by said rotor.

2. A rotary engine comprising a stator in the shape of a cylindrical drum, a central hollow shaft, spokes connecting said drum and shaft, a longitudinal partition in said hollow shaft defining manifolds, said spokes each having a pair of intake passages leading from said manifolds to the outer periphery of the drum; a cylindrical rotor enclosing said drum and forming an annular space around the same, abutments on the rotor projecting in said space to cooperate with the drum, gates mounted in said drum and means for raising each gate over an abutment and independent thereof, said means being actuated by said rotor, and walls closing the ends of said drum and contacting with said hollow shaft; said means including cams on said walls arranged opposite said abutments, a roller on each gate, and elements adapted to hold the rollers in engagement with the cams.

In testimony whereof I affix my signature.

ARTHUR J. WILLIAMS. [L. S.]

Certificate of Correction.

It is hereby certified that the name of the last mentioned assignee in Letters Patent No. 1,536,737, granted May 5, 1925, upon the application of Arthur J. Williams, of Nashville, Tennessee, for an improvement in "Rotary Engines for Vehicle Wheels," was erroneously written and printed as "Iva B. Glenn" whereas said name should have been written and printed as *Ivo B. Glenn*, as shown by the records of assignments in this office; and that the said Letters Patent should be read with this correction therein that the same may conform to the record of the case in the Patent Office.

Signed and sealed this 30th day of June, A. D. 1925.

[SEAL.]

KARL FENNING,
*Acting Commissioner of Patents.*